(12) United States Patent
Hinzmann et al.

(10) Patent No.: US 11,027,312 B2
(45) Date of Patent: Jun. 8, 2021

(54) TRANSPARENTLY COATED POLYCARBONATE COMPONENT, ITS PRODUCTION AND USE

(71) Applicant: Covestro Deutschland AG, Leverkusen (DE)

(72) Inventors: Dirk Hinzmann, Pulheim (DE); Timo Kuhlmann, Leichlingen (DE); Peter Capellen, Krefeld (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/469,394

(22) PCT Filed: Dec. 13, 2017

(86) PCT No.: PCT/EP2017/082556
§ 371 (c)(1),
(2) Date: Jun. 13, 2019

(87) PCT Pub. No.: WO2018/108978
PCT Pub. Date: Jun. 21, 2018

(65) Prior Publication Data
US 2020/0109248 A1    Apr. 9, 2020

(30) Foreign Application Priority Data
Dec. 15, 2016 (EP) ..................................... 16204244

(51) Int. Cl.
*C09D 183/04* (2006.01)
*B32B 5/14* (2006.01)
(Continued)

(52) U.S. Cl.
CPC ............... *B05D 7/02* (2013.01); *B05D 3/065* (2013.01); *B05D 7/53* (2013.01); *B32B 5/142* (2013.01);
(Continued)

(58) Field of Classification Search
None
See application file for complete search history.

(56) References Cited

U.S. PATENT DOCUMENTS

| | | | |
|---|---|---|---|
| 4,185,009 | A | 1/1980 | Idel et al. |
| 4,395,463 | A | 7/1983 | Kray |
| | | (Continued) | |

FOREIGN PATENT DOCUMENTS

| | | |
|---|---|---|
| DE | 1031512 B | 6/1958 |
| DE | 2500092 A1 | 7/1976 |
| | (Continued) | |

OTHER PUBLICATIONS

Machine Translation of JP-2011121305-A, Jun. 2011 (Year: 2011).*
(Continued)

*Primary Examiner* — Jeffrey A Vonch
(74) *Attorney, Agent, or Firm* — Faegre Drinker Biddle & Reath LLP

(57) ABSTRACT

The present invention relates to a multilayer construction containing a support or frame composed of a nontransparent polymer as layer c) and a transparent layer b) based on a thermoplastic polymer having a solar transmittance TDS of more than 20%, determined in accordance with ISO 13837: 2008 at a layer thickness of 4 mm, and a siloxane-based protective layer a) which is applied to layer c) and layer b), wherein the siloxane layer a) is selectively postcured in selected regions by means of ultrashort-wave UV radiation, and to a method for selective surface treatment.

20 Claims, 1 Drawing Sheet

Figure 1:
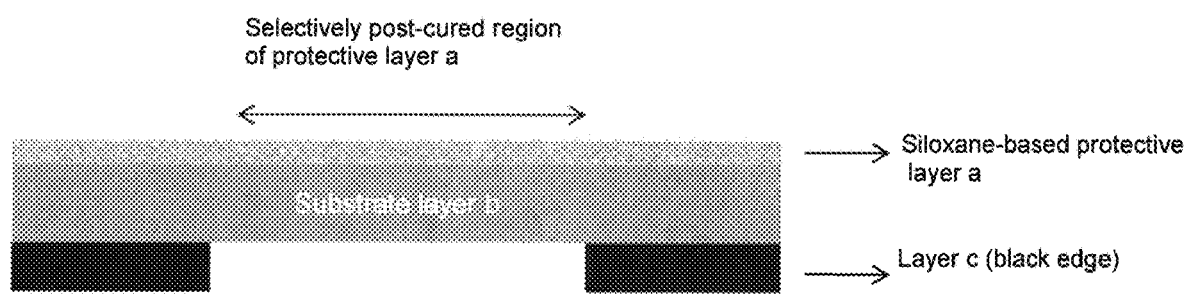

(51) Int. Cl.

| | | |
|---|---|---|
| *B32B 7/023* | (2019.01) | |
| *B32B 7/027* | (2019.01) | |
| *B32B 27/08* | (2006.01) | |
| *B32B 27/36* | (2006.01) | |
| *B05D 7/02* | (2006.01) | |
| *B05D 7/00* | (2006.01) | |
| *C08J 7/04* | (2020.01) | |
| *B05D 3/06* | (2006.01) | |
| *C08J 7/043* | (2020.01) | |
| *C08J 7/046* | (2020.01) | |
| *C09D 7/62* | (2018.01) | |
| *C09D 5/00* | (2006.01) | |
| *C08J 7/12* | (2006.01) | |
| *B32B 3/08* | (2006.01) | |
| *B29K 69/00* | (2006.01) | |
| *B29C 45/16* | (2006.01) | |

(52) U.S. Cl.
CPC .............. *B32B 5/147* (2013.01); *B32B 7/023* (2019.01); *B32B 7/027* (2019.01); *B32B 27/365* (2013.01); *C08J 7/042* (2013.01); *C08J 7/043* (2020.01); *C08J 7/046* (2020.01); *C09D 183/04* (2013.01); *B05D 3/067* (2013.01); *B05D 2201/00* (2013.01); *B05D 2518/10* (2013.01); *B29C 45/16* (2013.01); *B29K 2069/00* (2013.01); *B29K 2995/0012* (2013.01); *B29K 2995/0025* (2013.01); *B29K 2995/0026* (2013.01); *B29K 2995/0029* (2013.01); *B32B 3/08* (2013.01); *B32B 27/08* (2013.01); *B32B 2250/03* (2013.01); *B32B 2250/44* (2013.01); *B32B 2255/10* (2013.01); *B32B 2255/26* (2013.01); *B32B 2307/30* (2013.01); *B32B 2307/41* (2013.01); *B32B 2307/412* (2013.01); *B32B 2307/554* (2013.01); *B32B 2307/584* (2013.01); *B32B 2307/712* (2013.01); *B32B 2369/00* (2013.01); *B32B 2383/00* (2013.01); *B32B 2398/20* (2013.01); *C08J 7/123* (2013.01); *C08J 2369/00* (2013.01); *C08J 2483/04* (2013.01); *C09D 5/002* (2013.01); *C09D 7/62* (2018.01); *Y10T 428/161* (2015.01); *Y10T 428/24777* (2015.01); *Y10T 428/2942* (2015.01); *Y10T 428/31507* (2015.04)

(56) References Cited

U.S. PATENT DOCUMENTS

| | | | |
|---|---|---|---|
| 5,041,313 A | 8/1991 | Patel | |
| 5,235,026 A | 8/1993 | Wulff et al. | |
| 5,367,044 A | 11/1994 | Rosenquist | |
| 5,391,795 A | 2/1995 | Pickett | |
| 5,869,185 A | 2/1999 | Bahr et al. | |
| 6,228,973 B1 | 5/2001 | McCloskey et al. | |
| 6,350,512 B1 | 2/2002 | Hurley et al. | |
| 6,586,556 B2 | 7/2003 | Kratschmer et al. | |
| 6,613,869 B1 | 9/2003 | Horn et al. | |
| 7,425,358 B2 | 9/2008 | Heuer et al. | |
| 7,442,430 B2 | 10/2008 | Buckel et al. | |
| 7,547,755 B2 | 6/2009 | Heuer | |
| 8,968,610 B2 | 3/2015 | Meyer et al. | |
| 10,046,358 B2 | 8/2018 | Kuhn et al. | |
| 2006/0131928 A1* | 6/2006 | Onizawa .................... E06B 3/56 296/146.15 |
| 2007/0104956 A1* | 5/2007 | Grandhee ................. C09D 5/002 428/412 |
| 2007/0210287 A1* | 9/2007 | Guerra ...................... G02B 5/223 252/582 |
| 2008/0014367 A1* | 1/2008 | Charters .................... C09D 183/04 427/510 |
| 2009/0005499 A1* | 1/2009 | Fisher ....................... C09D 183/04 524/588 |
| 2009/0209673 A1* | 8/2009 | Lyon ......................... B32B 17/10761 522/2 |
| 2010/0189996 A1* | 7/2010 | Torr ........................... B32B 17/10348 428/332 |
| 2010/0304133 A1* | 12/2010 | Maeda ....................... B05D 7/04 428/339 |
| 2011/0097586 A1* | 4/2011 | Liao .......................... C08F 230/08 428/412 |
| 2011/0112240 A1* | 5/2011 | Krauter ..................... C08L 69/00 524/540 |
| 2011/0144250 A1* | 6/2011 | Meyer ....................... C08K 5/526 524/115 |
| 2011/0241376 A1* | 10/2011 | Igura ......................... B62D 25/105 296/146.3 |
| 2012/0141695 A1* | 6/2012 | Kakinuma ................. C09D 5/1675 428/1.33 |
| 2012/0153241 A1* | 6/2012 | Meyer ....................... C08K 5/0041 252/587 |
| 2012/0157587 A1* | 6/2012 | Meyer ....................... C08K 5/0041 524/88 |
| 2012/0276394 A1* | 11/2012 | Yamamoto ................ C23C 18/1233 428/447 |
| 2013/0171435 A1* | 7/2013 | Chi ............................ C08J 7/0427 428/212 |
| 2013/0224476 A1* | 8/2013 | Zheng ....................... C09D 5/32 428/327 |
| 2013/0242381 A1* | 9/2013 | Pudleiner ................. B32B 27/308 359/359 |
| 2013/0280452 A1* | 10/2013 | Nawroth ................... B60J 5/107 428/35.7 |
| 2014/0036064 A1* | 2/2014 | Lu ............................. B60Q 9/005 348/118 |
| 2014/0178635 A1* | 6/2014 | Imaizumi .................. B32B 27/36 428/138 |
| 2016/0325531 A1 | 11/2016 | Kühn et al. | |
| 2020/0247307 A1* | 8/2020 | Tsutsumi .................. B60R 11/04 |
| 2020/0363329 A1* | 11/2020 | Okumura ................... G02B 5/28 |
| 2020/0377692 A1* | 12/2020 | Grosser ...................... C08L 69/00 |
| 2020/0393568 A1* | 12/2020 | Grosser ..................... C08K 5/0041 |

FOREIGN PATENT DOCUMENTS

| | | | | |
|---|---|---|---|---|
| DE | 3121385 A1 | 8/1982 | | |
| DE | 4240313 A1 | 6/1994 | | |
| DE | 19943642 A1 | 3/2001 | | |
| EP | 0517044 A2 | 12/1992 | | |
| EP | 1308084 A1 | 5/2003 | | |
| EP | 1506249 A1 | 2/2005 | | |
| EP | 1582549 A1 | 10/2005 | | |
| EP | 2266711 A1 | 12/2010 | | |
| EP | 2527047 A1 | 11/2012 | | |
| EP | 2634208 A1 | 9/2013 | | |
| EP | 2711397 A1 | 3/2014 | | |
| EP | 3009485 A1 | 4/2016 | | |
| EP | 3047916 A1 | 7/2016 | | |
| JP | 04251718 A | * | 9/1992 | |
| JP | 09011406 A | * | 1/1997 | |
| JP | 2002036443 A | * | 2/2002 | |
| JP | 2002036870 A | * | 2/2002 | |
| JP | 2003004942 A | * | 1/2003 | |
| JP | 2006255928 A | * | 9/2006 | |
| JP | 2011121305 A | * | 6/2011 | |
| WO | WO-2002026862 A1 | 4/2002 | | |
| WO | WO-03095521 A1 | 11/2003 | | |
| WO | WO-2005113639 A1 | 12/2005 | | |
| WO | WO-2006108520 A1 | 10/2006 | | |
| WO | WO-2007131491 A2 | * | 11/2007 | ........... B60R 19/483 |
| WO | WO-2008037364 A1 | 4/2008 | | |
| WO | WO-2008109072 A1 | 9/2008 | | |
| WO | WO-2012080395 A1 | 6/2012 | | |
| WO | WO-2013120269 A1 | 8/2013 | | |

(56) References Cited

FOREIGN PATENT DOCUMENTS

| WO | WO-2015091425 A1 | 6/2015 | |
|---|---|---|---|
| WO | WO-2015141899 A1 * | 9/2015 | ............ C08J 7/0427 |
| WO | WO-2016128418 A1 | 8/2016 | |

OTHER PUBLICATIONS

Moretti et al., Advanced Polycarbonate Transparent Systems with Aerogel: Preliminary Characterization of Optical and Thermal Properties, May 2017, Energy Procedia, vol. 113, pp. 9-16 (Year: 2017).*

International Search Report for PCT/EP2017/082556 dated Jan. 31, 2018.

Written Opinion of the International Searching Authority for PCT/EP2017/082556 dated Jan. 31, 2018.

* cited by examiner

TRANSPARENTLY COATED POLYCARBONATE COMPONENT, ITS PRODUCTION AND USE

CROSS-REFERENCE TO RELATED APPLICATIONS

This application is a national stage application (under 35 U.S.C. § 371) of PCT/EP2017/082556, filed Dec. 13, 2017, which claims benefit of European Application No. 16204244.4, filed Dec. 15, 2016, both of which are incorporated herein by reference in their entirety.

The invention relates to a partially transparent multilayer construction containing a layer based on a thermoplastic, preferably of polycarbonate, and a transparent siloxane-based protective layer. The invention further relates to the production of the polymeric substrate layers in an injection molding process, to coating using a transparent siloxane topcoat and subsequent selective surface curing of the transparent siloxane-based protective layer using ultrashortwave UV radiation. Such produced, coated and selectively post-cured parts find use as a glass substitute for glazing and glazing elements and are for example roof modules in the automotive sector. Parts produced in this way can also be employed where high scratch resistance is required by standards and regulations. Such scratch resistance requirements are described for example in the American standard ANSI Z 26.1 for use as glazing.

Glazing made of compositions containing transparent thermoplastic polymers such as for example polycarbonate offer many advantages compared to conventional glazing made of glass for the automotive sector and for buildings. These include for example elevated fracture resistance and weight reduction which in the case of automobile glazing allow greater occupant safety in road traffic accidents and lower fuel consumption. Finally, transparent materials containing transparent thermoplastic polymers allow substantially greater design freedom on account of their easier moldability.

Panes in the transport sector often also contain nontransparent regions. Nontransparent layers are very common for example in panes in the automotive sector since functional elements may be hidden, or generally the adhesives for securing to the automobile body may be applied, in these regions. These panes typically contain at least one lacquer layer. The coating is intended to protect against environmental influences such as abrasion, scratching and the influence of weathering.

EP 2 266 711 A1 (US2010304133 A) discloses a process in which transparent plastics surfaces are coated with a siloxane-based topcoat, thermally cured and subsequently subjected to "post-curing" of the siloxane-based protective layer using ultrashortwave UV radiation. The post-curing is carried out using excimer lasers or excimer lamps. A dependence of the weathering stability of the construction according to the radiation dose or the color/the solar transmittance $T_{DS}$ of the construction is not described.

EP-A-2 527 047 and WO-A-2013 120269 describe lacquer-coated transparent parts.

EP-A-2 711 397, EP-A-2 634 208 and EP-A-3 009 485 describe UV-curing lacquers and not excimer laser-curable siloxane lacquers.

EP-A-3 047 916 describes headlight cover panes and how these may be lacquered. Suitable lacquers include UV-curable or thermally curable lacquers. None of the recited documents describe the present multilayer construction which is provided with siloxane lacquer and selectively post-cured.

One disadvantage of post-curing using ultrashortwave UV radiation (<200 nm) is that a marked reduction in the weathering stability of the coated part is observable according to the incident radiation dose onto the coated part. This effect also depends on the color of the part.

Furthermore, parts having a solar transmittance $T_{DS}$ of <1% can be expected to undergo premature failure of the part due to a reduction in weathering stability.

Such parts are also obtainable in a 2-component injection molding process. The parts preferably comprise a transparent polycarbonate layer and a nontransparent or nontransparently colored portion, a so-called black edge containing a polymer blend, preferably a polycarbonate blend. The black edge likewise has a solar transmittance $T_{DS}$ of <1%.

The present invention has for its object to provide a multilayer construction containing a substrate layer based on a nontransparent/nontransparently colored polymer blend, preferably a polycarbonate blend, and a substrate layer containing a transparent thermoplastic polymer, preferably a polycarbonate, and a siloxane-based protective layer, wherein the siloxane layer is selectively post-cured using ultrashortwave UV radiation, which does not exhibit the disadvantages of the prior art. The multilayer construction according to the invention may be employed instead of glass for example.

The multilayer construction according to the invention/a part containing the multilayer construction according to the invention exhibits an improved weathering stability preferably when using a polycarbonate substrate layer having a solar transmittance $T_{DS}$ of more than 20%, preferably 30% to 68%, particularly preferably 35% to 65%, in particular 45% to 65%. This was achieved when a selective surface irradiation of the siloxane-based protective layer on the transparent substrate layer, preferably based on a polycarbonate having the abovementioned solar transmittance range ($T_{DS}$), was carried out.

Selective surface irradiation is to be understood as meaning that only selected regions of the siloxane-based protective layer are subjected to a subsequent irradiation with ultrashortwave radiation of a particular intensity.

The part shall have a high scratch resistance/abrasion resistance and weathering stability. In addition the multilayer construction shall durably exhibit excellent optical properties, specifically a reduced loss of light transmission, a reduced haze increase, a low color change in the transparent region and a crack- and erosion-free surface in each case after weathering/action of media.

The present invention accordingly provides a multilayer construction containing a carrier or frame of a nontransparent polymer blend as layer c) and a transparent layer b) based on a thermoplastic polymer, preferably a polycarbonate, which has a solar transmittance $T_{DS}$ of more than 20% determined according to ISO 13837:2008 at a layer thickness of 4 nm and a siloxane-based protective layer a) applied atop layer c) and layer b), wherein the siloxane layer a) is selectively post-cured using ultrashortwave UV radiation in selected regions.

The present invention further provides a process for treating the siloxane-based layer a) of the abovedescribed multilayer construction wherein the siloxane-based layer a) is selectively post-cured using ultrashortwave UV radiation in selected regions.

A further embodiment moreover comprises a process for selective surface treatment of a 2-component part containing a carrier or frame made of a nontransparent colored polymer blend (layer c)) and a transparent portion according to layer b), wherein the transparent portion is enclosed by the carrier on at least 2 sides and wherein a siloxane-based layer a) is applied atop the carrier or frame and the transparent portion, wherein the siloxane-based layer a) is selectively post-cured using ultrashortwave UV radiation in selected regions.

Generation of the ultrashortwave UV radiation is via so-called excimer lamps or excimer lasers. The radiation dose is 200 to 2100 mJ/cm2, preferably 200 to 1600 mJ/cm2, particularly preferably 350 to 1000 mJ/cm2. Control of the emitted wavelength of the excimer radiation is effected through the use of different gas fillings. Examples of such gases are listed in table 1. It is preferable when gases resulting in an excimer radiation of less than 193 nm are used. A preferably employed wavelength is that of an Xe lamp having an emitted wavelength of 172 nm.

| Gas filling | λ (nm) | eV |
|---|---|---|
| Ar | 126 | 9.8 |
| Kr | 146 | 8.5 |
| $F_2$ | 157 | 7.9 |
| Xe | 172 | 7.2 |
| ArF | 193 | 6.4 |
| KrCl | 222 | 5.6 |
| KrF | 249 | 5.0 |
| XeCl | 308 | 4.0 |

It is preferable to perform the irradiation of the part in an evacuated chamber or in a chamber filled with a protective gas such as for example nitrogen or carbon dioxide. This prevents radiation absorption by oxygen in the ambient air. It is alternatively possible when using an excimer laser to merely place the protective gas in a cuvette in the beam path.

Flat parts exhibiting only very slight curvatures are preferably irradiated by excimer lamps.

Curved parts exhibiting high curvature radii are preferably irradiated with an excimer laser.

When using an Xe-based excimer radiation preferred radiation doses are between 115 and 2070 mJ/cm$^2$, particularly preferably between 460 and 1610 mJ/cm$^2$ and very particularly preferably between 690 and 1035 mJ/cm$^2$.

In a preferred embodiment an Xe-based excimer radiation at a dose of 700 to 1400 mJ/cm$^2$ is used.

At an irradiation intensity of about 23 mW/cm$^2$ preferred irradiation times are between 5 and 90 seconds, particularly preferably between 20 and 70 seconds and very particularly preferably between 30 and 45 seconds.

Siloxane-Based Protective Layer a):

The protective layer a preferably comprises a siloxane-based scratch-resistant lacquer (topcoat). The scratch resistant lacquer is preferably a polysiloxane lacquer produced by the sol-gel process. It is particularly preferable when the protective layer a) additionally contains at least one UV absorber. The protective layer a) has a high abrasion and scratch resistance and thus fulfils in particular the function of a scratch-resistant coating.

Commercially obtainable systems include for example Silfort AS4000, Silfort SliC5020 and Silfort AS4700 from Momentive Performance Materials. Such systems are described for example in U.S. Pat. No. 5,041,313 A, DE 3,121,385 A1, U.S. Pat. No. 5,391,795 A and WO 2008/109072 A1. The synthesis of these materials is typically effected by condensation of alkoxy- and/or alkylalkoxysilanes under acid or base catalysis. Nanoparticles can optionally be incorporated. Preferred solvents are alcohols such as butanol, isopropanol, methanol, ethanol and mixtures of these.

Various methods for producing a scratch-resistant coating on plastics articles are known. The protective layers may be applied for example by immersion processes, spin coating, spraying processes or flow coating, preferably by immersion or flow processes. Curing may be carried out by thermal means or using UV irradiation. The protective layer may be applied directly or after preparation of the substrate surface with a primer for example. A protective layer may also be applied by plasma-assisted polymerization processes, for example via an SiO2 plasma. Antifogging or antireflection coatings may likewise be produced via plasma processes. It is also possible to use particular injection molding processes, for example overmolding of surface-treated films, to apply a scratch-resistant coating atop the resulting molded article. The protective layer may comprise various additives, for example IJV absorbers derived from triazoles or from triazines for example.

The protective layer a) may be a single- or multilayer system and thus also a combination of two or more layers a1, a2 etc. In particular the protective layer a) may consist of a topcoat layer a1 and a primer layer a2, wherein the primer layer a2 is arranged between topcoat layer a1 and substrate layer b.

Polysiloxane-based protective layers are preferably applied by immersion or flow processes. Curing is effected at temperatures of 50° C.-140° C.

It is preferable to employ a UV absorber-containing primer as the primer layer a2 in order to improve the adhesion of the topcoat layer a1 on the substrate layer b. In further embodiments the primer contains stabilizers such as for example HALS systems (stabilizers based on sterically hindered amines), adhesion promoters and/or flow enhancers. The particular resin forming the base material of the primer layer a2 may be selected from a multiplicity of materials and is described for example in Ullmann's Encyclopedia of Industrial Chemistry, 5th Edition, Vol. A18, pp. 368-426, VCH, Weinheim 1991. Employable here are for example polyacrylates, polyurethanes, phenol-based systems, melamine-based systems, epoxy and alkyd systems or mixtures of these systems. The resin is usually dissolved in suitable solvents—often in alcohols. Hardening can be achieved at room temperature or at elevated temperatures, as required by the selected resin. It is preferable to employ temperatures between 50° C. and 140° C.—often once a large part of the solvent has been removed at room temperature over a short period. Commercially obtainable primer systems for layers $a_2$ are for example SHP470, SHP470-FT2050 and SHP401 from Momentive Performance Materials. Such coatings are described for example in U.S. Pat. Nos. 6,350,512 B1, 5,869,185 A, EP 1308084 A1 and WO 2006/108520 A1.

In a preferred embodiment which achieves particularly good weathering stability the protective layer a) comprises a polysiloxane-based topcoat for forming the topcoat layer $a_1$ containing i. at least one UV absorber from the group of benzophenones, resorcinols, 2-(2-hydroxyphenyl)benzotriazoles, hydroxyphenyl-s-triazines, 2-cyanoacrylates, oxalanilides and optionally a UV inhibitor from the group of sterically hindered amities (HALS), in particular based on 2,2,6,6-tetramethylpiperidine or derivatives thereof; and ii. at least one combination of an organomodified silane with a silica sol.

The organo-modified silane is for example and especially preferably a methyltrialkoxy or dimethyldialkoxysilane. In a more preferred embodiment it is additionally possible to employ between the topcoat layer a1 and the substrate layer b) an adhesion promoter (primer layer a2) 1.

The primer layer a2 contains a binder and at least one UV absorber from the group of benzophenones, resorcinols, 2-(2-hydroxyphenyl)benzotriazoles, hydroxyphenyl-s-triazines, 2-cyanoacrylates, oxalanilides and/or sterically hindered amines (HAM), in particular based on 2,2,6,6-tetramethylpiperidine and derivatives thereof.

The binder is preferably a physically drying polyalkyl (meth)acrylate preferably containing methyl methacrylate as the main component and optionally a further alkyl (meth) acrylate having a relatively long linear or branched alkyl chain ($-C_nH_{n+1}$ where n>1), preferably $1 \leq n \leq 10$, particularly preferably linear where n=4 (butyl methacrylate). It is preferable when the polyalkyl (meth)acrylate contains methacrylate monomer units in amounts of 75% to 100% by weight and t and 25% to 0% by weight of alkyl methacrylate monomer units, preferably 85% to 100% by weight of methacrylate and 15 to 0% by weight of alkyl methacrylate, particularly preferably 90% to 100% by weight of methyl methacrylate and 10% to 0% by weight of alkyl methacrylate.

The thickness of the primer layer a2 is generally 0.3 µm to 8 µm, preferably 1.1 µm to 4.0 µm.

According to the invention the term "derivatives" is to be understood as meaning compounds whose molecular structure comprises at the position of an H atom or a functional group a different atom or a different group of atoms or where one or more atoms/groups of atoms has/have been removed. The parent compound thus remains recognizable.

The polysiloxane layer a1 preferably contains organosilicon compounds of formula (I)

$$R_nSiX_{4-n}, \quad (I)$$

and/or partial condensates thereof, wherein the radicals R are identical or different and represent a linear or branched, saturated or mono- or polyunsaturated or aromatic hydrocarbon radical, the radicals X are identical or different and represent hydrolyzable groups or hydroxyl groups, preferably halogen, in particular chlorine or bromine, alkoxy groups, alkylcarbonyl groups or acyloxy groups and n is 0, 1, 2 or 3, preferably 1 or 2, very particularly preferably 1.

R preferably represents saturated, branched or unbranched alkyl radicals having 1 to 20 carbon atoms and/or represents mono- or polyunsaturated branched or unbranched alkenyl radicals having 2 to 20 carbon atoms or aromatic groups having 6 to 12 carbons. The alkyl/alkenyl radicals more preferably have up to 12, yet more preferably up to 8, carbons. Methyl and/or phenyl are particularly preferred.

It is particularly preferable when X represents an alkoxy group, very particularly preferably a C1- to C4-alkoxy group, in particular a methoxy group or an ethoxy group.

The silicon compounds $R_nSiX_{4-n}$ are hydrolyzable and condensable via the radicals X. An inorganic network comprising Si—O—Si units is constructed via these hydrolytically condensable groups. In contrast to the radicals X, the radicals R are stable to hydrolysis under the typical condensation conditions.

Preferred coating thicknesses for the primer layer a2 are in the range 0.3 µm to 8 µm, preferably 1.1 µm to 4.0 µm.

The layer thicknesses for the siloxane layer a1 are in the range 4.0 µm to 12.0 to 12.0 µm, preferably 4.0 µm to 8 µm.

Layer thickness is to be understood as meaning the dry layer thickness, i.e. the layer thickness of the lacquer layer after application, subsequent evaporation of the solvent and subsequent thermal or UV curing.

In a particularly preferred process the protective layer a/the topcoat layer a1 and the primer layer a2 are applied using the flow-coating process since it results in coated parts having a high optical quality.

The flow coating process can take place manually with a hose or suitable coating head or automatically in a continuous procedure by way of flow-coating robots and optionally slot dies.

Further possible methods of application are immersion, blade coating, rolling, spraying or spin coating. The parts may be coated either while suspended or while mounted in an appropriate holder.

For larger and/or 3D parts—i.e. parts having a three-dimensional surface which thus have a geometry departing from that of a sheet—the part to be coated is suspended or mounted in a suitable holder.

In the case of small-scale parts, the coating procedure can also be carried out manually. In this case the to-be-layered liquid primer or lacquer solution for forming the protective layer a2/a1 is poured over the sheet in the longitudinal direction starting from the upper edge of the small-scale part while simultaneously passing the starting point of the lacquer on the sheet from left to right over the sheet width. The lacquered sheets are aired and cured while suspended vertically in a clamp according to the respective manufacturer requirements.

The layer thickness of the layers a)/a1 and a2 may be determined for example by white light interferometry (for example using a white light interferometer from Eta Optic; ETA-SST), which is preferred. Cross section preparation and microscopic detection (by optical microscopy or scanning electron microscopy) of the layers may also be used to detect the thickness via material contrast.

Substrate Layer b):

The substrate layer b) of the part contains a thermoplastic having a solar transmittance $T_{DS}>20\%$ and may be completely flat, have different degrees of curvature or may have a three-dimensional configuration in the form of bulges, waves or further shapes.

The thermoplastic may be transparent either in the visual wavelength range or in the IR range. In the context of the present invention transparent in the visual wavelength range is to be understood as meaning that the light transmission of the plastic (ASTM 1003:2.011; ISO 13468:2006; reported in % and with illuminant D65/10°) is preferably at least 80%, particularly preferably at least 85% and very particularly preferably at least 87%. 1-laze is moreover preferably less than 3%, more preferably less than 2.5%, and particularly preferably less than 2.0%.

A further preferred substrate layer b) is IR-transparent (i.e. the substrate layer b) exhibits no appreciable absorption between 780 and 2500 nm save for the absorption bands attributable to the polymer, in particular the polycarbonate, itself; i.e. the average transmittance of the substrate layer in the range between 780 and 2500 nm is at least 10%, preferably at least 30%, more preferably at least 50%), contains less than 0.001% by weight of carbon black, more preferably less than 0.0001% by weight of carbon black, preferably no carbon black whatsoever and preferably less than 0.001% by weight, particularly preferably less than 0.0001% by weight, of IR absorbers distinct from carbon black and in particular no IR absorbers distinct from carbon black. Average transmittance is to be understood as meaning the arithmetic average of the transmittance measured according to ISO 13468-2:2006.

Suitable colorants are in particular anthraquinone-based, perinone-based, phthalocyanine-based colorants or colorants derived from these structures. Particularly preferred colorants are described in WO 2012/080395 A1. Also employable as colorants are Macrolex Violet 3R (CAS 61951-89-1; Solvent Violet 36), Macrolex Green 5B (CAS 128-80-3; Solvent Green 3; C.I. 61565), Amaplast Yellow GHS (CAS 13676-91-0; Solvent Yellow 163; C:I: 58840), Macrolex Orange 3G (CAS 6925-69-5; Solvent Orange 60; C.I. 564100), Macrolex Blue RR (CAS 32724-62-2; Solvent Blue 97; C.I, 615290); Keyplast Blue KR. (CAS 116-75-6; Solvent Blue 104; C.I. 61568), Heliogen Blue varieties (for example Heliogen Blue K 6911; CAS 147-14-8; Pigment Blue 15:1; C.I. 74160), Heliogen Green varieties (for example Heliogen Green K 8730; CAS 1328-53-6; Pigment Green 7; C.I. 74260) and Macrolex Green G (CAS 28198-05-2; Solvent Green 28; C.I. 625580).

In this embodiment (see e.g. example 2) light transmission in the range from 380 to 780 nm, i.e. in the VIS range, is less than 1.0%, preferably 0%, determined at a layer thickness of 4 nm according to DIN ISO 13468-2:2006 (D65, 10°) and the $T_{DS}$ value determined according to ISO 13837:2008 at a layer thickness of 4 mm is less than 40%.

The use of such an IR-transparent substrate layer, in particular one based on polycarbonate, is particularly preferred according to the invention, The production of three-dimensional substrate layers b), but also sheetlike layers, starting from the abovedescribed polymer composition containing the ahovementioned components is effected with commonly used incorporation methods by combining, mixing and homogenizing, wherein in particular homogenizing preferably in the melt under the action of shear threes takes place. To this end, the thermoplastic polymer, preferably aromatic polycarbonate, and any further components of the polymer molding material, preferably of the polycarbonate molding material, are mixed, extruded and granulated in the melt under customary conditions in customary melt mixing assemblies such as for example in single-screw or multi-screw extruders or in kneaders. The additives may be metered in either separately as granulates/pellets via weigh feeders or side feed devices or else metered at a suitable location into the solids conveying region of the extruder or into the polymer melt at elevated temperature as a melt by means of metering pumps. The masterbatches in the form of granulates or pellets may also be combined with other particulate compounds to afford a premixture and then supplied together into the solids conveying region of the extruder or into the polymer melt in the extruder via metering hoppers or side feed devices. The compounding assembly is preferably a twin-screw extruder, particularly preferably a twin-screw extruder having corotating screws, wherein the twin-screw extruder preferably has a screw length/diameter ratio of 20 to 44, particularly preferably of 28 to 40. Such a twin-screw extruder comprises a melting zone and a mixing zone or a combined melting and mixing zone and optionally a degassing zone where an absolute pressure p of preferably not more than 800 mbar, more preferably not more than 500 mbar, particularly preferably not more than 200 mbar, is established. The average residence time of the mixture composition in the extruder is preferably limited to not more than 120 seconds, particularly preferably not more than 80 seconds, particularly preferably not more than 60 seconds. In a preferred embodiment the temperature of the melt of the polymer/of the polymer alloy at the extruder outlet is 200° C. to 400° C.

In addition to extrusion the compositions employed for the substrate layer b may be converted into the substrate layer b by hot press molding, spinning, blow molding, deep drawing or injection molding. Injection molding or injection-compression molding is preferred here.

Injection molding processes are known to those skilled in the art and described for example in "Handbuch Spritzgießen", Friedrich Johannaber/Walter tvlichaeli, Munich; Vienna: Hanser, 2001, ISBN 3-446-15632-1 or in "Anleitung zum Bau von Spritzgießwerkzeugen", Menges/Michaeli/Mohren, Munich; Vienna: Hanser, 1999, ISBN 3-446-21258-2.

Injection molding is here to be understood as comprising all injection molding processes including multicomponent injection molding and injection-compression molding processes.

Injection-compression molding processes differ from conventional injection molding processes in that the injection and/or solidification procedure involves mold plate movement. In the known injection-compression molding process, the mold plates are already opened slightly before the injection procedure to compensate for the shrinkage occurring during subsequent solidification and to reduce the required injection pressure. A pre-enlarged cavity is therefore already present at the beginning of the injection procedure. Flash faces of the mold ensure that the pre-enlarged cavity is still sufficiently leakproof even when the mold plates have been somewhat opened. The plastics material is injected into this pre-enlarged cavity and is simultaneously/subsequently compressed as the mold moves towards the closed position. Particularly in the production of large surface area and thin-walled moldings having long flow paths, the more complex injection-compression molding technique is preferred or in some cases essential. Only in this way can a reduction of the injection pressures required for large moldings be achieved. Furthermore, stresses/warpage in the injection molded part arising from high injection pressures can be avoided by injection-compression molding. This is important particularly in the production of optical plastics applications, such as for example glazing (windows) in motor vehicles, since optical plastics applications can easily be affected by stresses in the part which can impair the optical and mechanical properties.

The production of the multilayer construction according to the invention is carried out using injection molding or injection-compression molding processes.

Thermoplastics for layer b) are polycarbonate, copolycarbonate, polyester carbonate, polystyrene, styrene copolymers, aromatic polyesters such as polyethylene terephthalate (PET), PET-cyclohexanedimethanol copolymer (PETG), polyethylene naphthalate (PEN), polybutylene terephthalate (PBT), polyamide, cyclic polyolefin, poly- or copolyacrylates and poly- or copolymethacrylate, for example poly- or copolymethyl methacrylates (such as PMMA), and also copolymers with styrene, for example transparent polystyrene-acrylonitrile (PSAN), thermoplastic polyurethanes, polymers based on cyclic olefins (for example TOPAS®, a product commercially available from Ticona) and further preferably polycarbonate, copolycarbonate, polyester carbonate, aromatic polyesters or polymethyl methacrylate (PMMA), or mixtures of the components mentioned, and particularly preferably polycarbonate and copolycarbonate.

Mixtures of two or more thermoplastic polymers, particularly when they are transparently miscible with one another, are also possible and in a specific embodiment a mixture of polycarbonate with PMMA (more preferably with <2% by weight of PMMA) or polyester is preferred.

In this context a further specific embodiment contains a mixture of polycarbonate and PMMA with less than 2.0% by weight, preferably less than 1.0% by weight, more preferably less than 0.5% by weight, wherein at least 0.01% by weight of PMMA are present based on the amount of polycarbonate, wherein the PMMA preferably has a molar weight of <40 000 g/mol. In a particularly preferred embodiment the proportion of PMMA is 0.2% by weight and particularly preferably 0.1% by weight based on the amount of polycarbonate, wherein the PMMA preferably has a molar weight of <40 000 g/mol.

An alternative further specific embodiment contains a mixture of PMMA and polycarbonate with less than 2% by weight, preferably less than 1% by weight, more preferably less than 0.5% by weight, wherein at least 0.01% by weight of polycarbonate are present, based on the amount of PMMA.

In a particularly preferred embodiment, the proportion of polycarbonate is 0.2% by weight and particularly preferably 0.1% by weight based on the amount of PMMA.

Suitable polycarbonates for producing the plastics compositions according to the invention include all known polycarbonates. These are homopolycarbonates, copolycarbonates and thermoplastic polyester carbonates.

The polycarbonates are preferably produced by the interfacial process or the melt transesterification process which are extensively described in the literature.

With regard to the interfacial process reference is made for example to H. Schnell, "Chemistry and Physics of Polycarbonates", Polymer Reviews, Vol. 9, Interscience Publishers, New York 1964 p. 33 et seq., to Polymer Reviews, Vol. 10, "Condensation Polymers by Interfacial and Solution Methods", Paul W. Morgan, Interscience Publishers, New York 1965, Chapt. VIII, p. 325, to Dres. U. Grigo, K. Kircher and P. R-Müller "Polycarbonate" in Becker/Braun, Kunststoff-Handbuch, Volume 3/1, Polycarbonate, Polyacetale, Polyester, Cellutoseester, Carl Hanser Verlag Munich, Vienna 1992, p. 118-145 and also to EP 0 517 044 A1.

The melt transesterification process is described, for example, in the Encyclopedia of Polymer Science, Vol. 10 (1969), Chemistry and Physics of Polycarbonates, Polymer Reviews, H. Schnell, Vol. 9, John Wiley and Sons, Inc. (1964), and in patent specifications DE-B 10 31 512 and US-13 6 228 973.

The polycarbonates are preferably prepared by reactions of bisphenol compounds with carbonic acid compounds, especially phosgene, or diphenyl carbonate or dimethyl carbonate in the melt transesterification process.

Particularly preferred here are homopolycarbonates based on bisphenol A and copolycarbonates based on the monomers bisphenol A and 1,1-bis(4-hydroxyphenyl)-3,3,5-trimethylcyclohexane.

These and other bisphenol compounds or diol compounds that may be used for polycarbonate synthesis are disclosed inter alia in WO 2008037364 A1 (p. 7, line 21 to p. 10, line 5), EP 1 582 549 A1 ([0018] to [0034]), WO 2002026862 A1 (p. 2, line 20 to p. 5, line 14), WO 2005113639 A1 (p. 2, line 1 to p. 7, line 20).

The polycarbonates may be linear or branched. Mixtures of branched and unbranched polycarbonates may also be employed.

Suitable branching agents for polycarbonates are known from the literature and described for example in the patent specifications US-B 4 185 009 and DE 25 00 092 A1 (inventive 3,3-bis-(4-hydroxyaryloxindoles, see entire document in each case), DE 42 40 313 A1 (see p. 3, lines 33 to 55), DE 19 943 642 A1 (see p. 5, lines 25 to 34) and US-B 5 367 044 and also in literature cited therein.

The employed polycarbonates may moreover also be intrinsically branched, in which case no branching agent is added in the course of polycarbonate production. One example of intrinsic branches is that of so-called Fries structures, as disclosed for melt polycarbonates in EP 1 506 249 A1.

Polycarbonate production may also employ chain terminators. Preferably employed as chain terminators are phenols such as phenol, alkylphenols such as cresol and 4-tert-butylphenol, chlorophenol, bromophenol, cumylphenol or mixtures thereof.

Also addable to the thermoplastics compositions in the customary amounts are the additives customary for the recited thermoplastics such as fillers, UV stabilizers, heat stabilizers, antistats, dyes and pigments, mold release agents, IR absorbers and flame retardants. It is particularly preferable to use only such additives which do not impair the transparency of the material.

Suitable additives are for example described in "Additives for Plastics Handbook, John Murphy, Elsevier, Oxford 1999" and in "Plastics Additives Handbook, Hans Zweifel, Hanser, Munich 2001".

In a particularly preferred embodiment of the present invention, the thermoplastic for the carrier of the multilayer system is a polycarbonate having an average molecular weight Mw of 22 000 to 35 000, more preferably of 24 000 to 31 000 and particularly preferably of 25 000 to 30 000 determined by gel permeation chromatography with polycarbonate calibration.

In a particularly preferred embodiment the thermoplastic for the carrier of the multilayer system is a linear polycarbonate based on bisphenol A having an MVR von 5-20, preferably 6-18, especially preferably 8-16, and very particularly preferably 10-15 cm3/10 min at 300° C. and 1.2 kg of loading according to ISO 1133.

It is preferable when the abovementioned polycarbonates contain phenol and/or tert-butyl phenol and/or cumylphenol as chain terminators.

The flowability of the polycarbonate used for producing the substrate layer is moreover sufficient to achieve in the injection-compression molding process flow paths of 600 mm to 1200 mm, preferably 800 mm to 1100 mm, particularly preferably 900 mm to 1000 mm, wherein the melt temperature is preferably from 280° C. to 320° C., more preferably from 300° C. to 310° C., the mold temperature is preferably from 60° C. to 110° C., more preferably from 80° C. to 1.00° C., the injection pressure is from 50 bar to 1000 bar, more preferably from 80 bar to 750 bar and particularly preferably from 100 bar to 500 bar and the compression gap is from 0.5 mm to 10 mm, preferably from 2 mm to 7 mm, particularly preferably from 5 mm to 6 mm. Optionally disposed between B and A is a screen print (on portions of the pane, for nontransparent region or heating/antennae) or a 2K injection molded component.

Preferred thicknesses of the transparent layer are between 2 and 10 mm, particularly preferably between 3 and 8 mm and very particularly preferably between 4 and 7 mm.

The thickness of layer b) is preferably determined by means of micrometer calipers.

Layer c) (Optional)

The multilayer article according to the invention may further comprise at least one further layer c). Layer c) is a nontransparent layer. In the context of the present invention nontransparent is to be understood as meaning a transmission in the visible wavelength range (380 nm to 780 nm) of <5%, preferably less than 3%, very particularly preferably less than 1%.

In particular the multilayer article of the car body part according to the invention may have a black edge/reinforcing frame elements. A black edge is a nontransparent layer, preferably made of a polymer blend, more preferably made of a polycarbonate blend, in particular comprising polycarbonate as the predominantly present component. Such a nontransparent layer is over large regions in direct contact with the ahovedescribed layer construction. The black edge is below layer b) on the opposite side of layers a).

It is preferable when this nontransparent material comprises/frames the substrate layer b and/or further layers directly or indirectly joined thereto or alternatively the entire multilayer construction completely or partially in the edge regions. Upon shaping of the nontransparent material the junction between the materials is preferably in edge regions so that any irregularities are concealed. In every case there are regions in which the substrate layer b) is disposed upon the nontransparent layer or the nontransparent layer is disposed upon the substrate layer b). The term "disposed upon" is here to be understood as meaning an overlapping of the layers when the multilayer article is viewed perpendicularly to the joint face of the individual layers. It will be appreciated that the nontransparent layer need not be but may be in direct contact with the substrate layer b since it may be arranged behind further layers, for instance layer c.

Layer c is preferably a coating, a film or preferably a polymer blend, more preferably made of a polycarbonate blend, in particular comprising polycarbonate as the predominantly present component.

Such a nontransparent layer is over large regions in direct contact with layer b. It is preferable when this nontransparent material comprises/frames layer b and/or further layers directly or indirectly joined thereto or alternatively the entire multilayer construction completely or partially in the edge regions. Upon shaping of the nontransparent material the junction between the materials is preferably in edge regions so that any irregularities are concealed. In every case there are regions in which layer b is disposed upon the nontransparent layer c or the nontransparent layer c is disposed upon layer b. The term "disposed upon" is here to be understood as meaning an overlapping of the layers when the multilayer article is viewed perpendicularly to the joint face of the individual layers. It will be appreciated that the nontransparent layer need not be but may be in direct contact with the substrate layer 1) since it may be arranged behind further layers.

These nontransparent materials are used for forming black edges in glazing or as reinforcing frame elements. Materials suitable for the production of black edges or reinforcing frame elements are the use of thermoplastics containing fillers/reinforcers, in particular the use of plastics blends provided with such additives. Blends containing polycarbonate and at least one other thermoplastic are preferred in this context.

The employed fillers and reinforcers may be fibrous, platelet-shaped, tubular, rod-shaped, spherical or particulate. Fillers and reinforcers suitable in the context of the present invention include for example talc, wollastonite, mica, kaolin, kieselguhr, calcium sulfate, calcium carbonate, barium sulfate, glass fibers, glass spheres, ceramic spheres, hollow glass spheres, hollow ceramic spheres, glass wool, mineral wool, carbon fibers and carbon nanotubes. Preferred fillers are fillers which bring about isotropic shrinkage of the composition.

The use of talc and short glass fibers is particularly preferred in the co present invention.

Glass or ceramic spheres or hollow spheres can increase the scratch resistance of this surface.

In the compositions of layer c the content of fillers and reinforcers is 5% by weight to 40% by weight, preferably 7% by weight to 30% by weight, more preferably 8% by weight to 25% by weight, wherein the reported weights are based on the total composition of the substrate layer c.

Suitable thermoplastics for optional layer c are preferably aromatic polycarbonate, copolycarbonate, polyester carbonate, polystyrene, styrene copolymers, aromatic polyesters such as polyethylene terephthalate (PET), PET-cyclohexanedimethanol copolymer (PETE), polyethylene naphthalate (PEN), polybutylene terephthalate (PBT), aliphatic polyolefins such as polypropylene or polyethylene, cyclic polyolefin, poly- or copolyacrylates or poly- or copolymethacrylate, for example poly- or copolymethyl methacrylates (such as PMMA), and also copolymers with styrene, for example transparent polystyrene-acrylonitrile (PSAN), thermoplastic polyurethanes, polymers based on cyclic olefins (for example TOPAS®, a product commercially available from Ticona), polycarbonate blends with olefinic copolymers or graft polymers, for example styrene/acrylonitrile copolymers.

Particularly preferred are PMMA, PET, PEN, PETE, polycarbonate, copolycarbonate or polyester carbonate. PMMA, PET or PEN is very particularly preferred. The abovementioned polymers may be employed alone or in mixtures.

Layer c has a thickness of up to 600 μm, preferably up to 500 μm, more preferably up to 200 μm. Layer c may also be a sequence of two or more layers, wherein the total thickness thereof does not exceed the recited limits.

Preferred film thicknesses of thermoplastic layer c are 10 μm to 500 μm. Particularly preferred film thicknesses are 20 μm to 250 μm. Films having a thickness of 25 μm to 150 μm are very particularly preferred as a carrier material.

Layer c may be applied atop layer b) by processes known to those skilled in the art. Multicomponent injection molding, adhesive bonding or lacquering are suitable in particular.

FIG. 1 describes a multilayer construction according to the invention provided with a siloxane-based layer a) which is applied above layer b) and an optional further layer c) and which is selectively post-cured in the region characterized by layer b). In this representation layer c) represents a frame.

Figure 2:
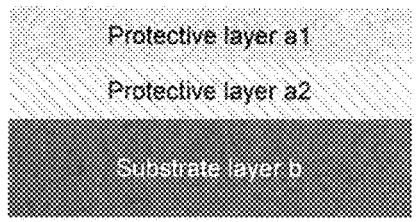

FIG. 2 represents a multilayer construction composed of 2 layers, wherein the siloxane-based layer a) in turn consists of a topcoat layer at and a primer layer a2, and the substrate layer b).

EXAMPLES

The invention is hereinbelow more particularly described with reference to working examples, the methods of determination described here being used for all corresponding parameters in the present invention description unless otherwise stated.

The experiments which follow relate to layer constructions composed of the layers a and b, wherein layer h is chosen such that $T_{DS}$ varies.

Siloxane-Based Protective Layer a)
Primer for layer a2:
Silfort SHP470 FT 2050 is a primer having a solids content of 9% by weight, a specific density of 0.94-0.96 g/cm3 at 20° C. and a viscosity at 25° C. of 75 to 95 MPa s based on 1-methoxy-2-propanol as solvent. The product is available from Momentive Performance Materials GmbH, Leverkusen.

Topcoat for layer a1:

Silfort AS4700 is a thermally curing siloxane-based topcoat containing isopropanol, n-butanol and methanol as solvent, having a solids content of 25% by weight, a specific density of 0.92 g/cm3 at 20° C. and a viscosity measured at 25° C. of 3-7 MPa s. The product is available from Momentive Performance Materials GmbH, Leverkusen.

Application was performed manually. The liquid primer or topcoat solution for forming the layers was poured over the sheet in the longitudinal direction starting from the upper edge of the small-scale part while simultaneously passing the starting point of the lacquer on the sheet from left to right over the sheet width. After a flash-off time of 30 minutes at 23° C. the coated sheets hanging vertically on a clamp were subsequently cured at 130° C. for 60 minutes. Following the application of the primer layer a2 the topcoat material was applied analogously as the topcoat layer at and, after a 30-minute flash-off time at 23° C., was cured at 130° C. for 60 minutes.

The layer thickness of the layers a1 and a2 was determined by white light interferometry (for example by means of a white light interferometer from Eta Optic; ETA-SST).

Substrate Layer b

Substrate 1: Visually transparent sheet made of polycarbonate having an MVR of about 12 cm$^3$/(10 min) measured at 300° C. at a loading of 1.2 kg (according to ISO 1133-1:2012-03) from Covestro Deutschland AG.

Substrate 2: Visually nontransparent sheet made of polycarbonate from Covestro Deutschland AG having an MVR of about 12 cm$^3$/10 min measured at 300° C. at a loading of L2 kg (according to ISO 1133-1:2012-03); based on bisphenol A and terminated with phenol. The material contains 0.1% by weight of Macrolex Green 5B (1,4-bis(tolylamino)anthraquinone; anthraquinone dye; Solvent Green 3; Color index 61565) from Lanxess AG and 0.1% by weight of Macrolex Violet 3R (anthraquinone dye; Solvent Violet 36; Color index number 61102) from Lanxess AG. The polycarbonate has a light transmission in the VIS range of the spectrum (380 to 780 nm) of about 0%.

Substrate 3: Visually nontransparent sheet made of polycarbonate from Covestro Deutschland AG having an MVR of about 12 cm$^3$/10 min measured at 300° C. at a loading of 1.2 kg (according to ISO 1133-1:2012-03); based on bisphenol A and terminated with phenol. The material contains 0.16% by weight of carbon black and has a light transmission in the VIS range of the spectrum (380 to 780 nm) of 0%.

The sheets were produced by the injection molding process and had a thickness of 4 mm.

The light transmission in the VIS region of the spectrum (380 to 780 nm, transmittance $T_{VIS}$) of the sheets was determined according to DIN ISO 13468-2; 2006 (D65, 10', layer thickness of specimen sheet: 4 mm).

The direct solar transmittance $T_{DS}$ of the substrate material was determined at a layer thickness of 4 mm according to ISO 13837:2008. The transmission measurements were performed using a Perkin Elmer Lambda 950 spectrophotometer with a photometer sphere. All values were determined in the course of measurement with wavelengths of 320 nm to 2500 nm inclusive where AX is 5 nm.

The average IR transmittance is to be understood as meaning the arithmetic average of the transmittance in the wavelength range of 780 to 2500 nm which is determined at a layer thickness of 4 mm according to ISO 13468-2:2006.

TABLE 2

Transmission data for the substrate materials

| | Thickness | $T_{VIS}$ (%) | $T_{DS}$ (%) | Average IR transmittance (%) |
|---|---|---|---|---|
| Substrate 1 | 4 mm | 88 | 59 | 56 |
| Substrate 2 | 4 mm | 0 | 37.4 | 56 |
| Substrate 3 | 4 mm | 0 | ≤1 | ≤1 |

Selective Surface Treatment using Excimer Lamp

Post-curing was performed with an excimer lamp (Xe lamp, emitted wavelength 172 nm) with different radiation doses achieved via different irradiation times of the coated substrates. The irradiation apparatus used was the L-VUV-UV laboratory apparatus from IOT.

The abrasion/scratch resistance of the non-post-treated/excimer-lamp-post-treated coated substrates 1 to 3 was determined by means of the Taber abrasion test according to ASTM 1044 (2008 version). Depending on whether the substrate was transparent or dark-colored, scratching was determined by measuring haze or gloss before and after the Taber abrasion test.

Haze measured according to the standard ASTM 1003 (2011 version). ΔHaze is determined according to the following formula:

$$\Delta Haze = Haze_{(initial\ value)} - Haze_{(value\ after\ Taber)}$$

For the nontransparent sheets, gloss was measured. Gloss is measured according to the standard DIN EN ISO 2813 at an angle of 20°. Agloss is determined according to the following formula:

$$\Delta gloss = \frac{Value\ (after\ test) - Value\ (before\ test)}{Value\ (before\ test)} \times 100\%$$

The smaller ΔHaze/gloss, the more resistant the tested surface to externally induced abrasion.

TABLE 3

Layer thicknesses of the protective layer a (cf. FIG. 2)

| | Ex. 1 to 3 (μm) | Ex. 4 to 6 (μm) |
|---|---|---|
| Primer layer $a_2$ | 1.0-1.4 | 1.8-3.0 |
| Siloxane-based topcoat layer $a_1$ | 3.0-4.0 | 7.0-9.0 |

Weathering of the Samples

The coated sheets were subjected to an accelerated weathering test in an Atlas Ci 5000 Weatherometer with an irradiation strength of 0.75 W/m$^2$/nm at 340 nm and a drying/rain cycle of 102: 18 minutes (referred to hereinbelow as ASTM G155 mod.).

The coated substrates were weathered for 2200 hours.

Evaluation of the samples after performing the weathering as per the method ASTAI G155 mod was carried out according to scores 1 to 3, wherein:

1=no damage to coating,
2=light damage to coating in the form of clouding or light cracking, 3=severe damage to coating in the form of cracking or delamination of the lacquer layer.

Inventive Example 1

Substrate 1 combined with primer layer a2 in a layer thickness range of 1.8 to 2.2 µm and siloxane-based topcoat layer $a_1$ in a layer thickness range of 5.5 to 6.5 µm. This was followed by post-curing using excimer lamps with a wavelength of 172 nm and different radiation doses. ΔHaze was determined after 1000 cycles of the Taber test. The non-irradiated sample served as a reference.

| Radiation dose(mJ/cm²) | ΔHaze (%) | Weathering (score 1-3) |
|---|---|---|
| No weathering reference | 2.6 | 1 |
| 700 (inventive) | 1.4 | 1 |
| 1400 (inventive) | 1.3 | 1 |
| 2200 (comparison) | 1.0 | 3 |

Inventive Example 2

Substrate 2 combined with primer layer a2 in a layer thickness range of 1.8 to 2.2 µm and siloxane-based topcoat layer $a_1$ in a layer thickness range of 5.5 to 6.5 µm. This was followed by post-curing using excimer lamps with a wavelength of 172 nm and different radiation doses. ΔGloss was determined after 1000 cycles of the Taber test.

| Radiation dose (mJ/cm²) | ΔGloss | Weathering (score 1-3) |
|---|---|---|
| No irradiation | 4.9 | 1 |
| 700 | 2.5 | 1 |
| 1400 | 2.5 | 2 |
| 2200 | 2.4 | 3 |

Comparative Example 3

Substrate 3 combined with primer layer a2 in a layer thickness range of 1.8 to 2.2 µm and siloxane-based topcoat layer a1 in a layer thickness range of 5.5 to 6.5 µm. This was followed by post-curing using excimer lamps with a wavelength of 172 nm and different radiation doses. ΔGloss was determined after 1000 cycles of the Taber test.

| Radiation dose (mJ/cm²) | ΔGloss | Weathering (score 1-3) |
|---|---|---|
| No irradiation | 6.7 | 1 |
| 700 | 3.2 | 3 |
| 1400 | 2.5 | 3 |
| 2200 | 2.4 | 3 |

Inventive Example 4

Substrate 1 combined with primer layer a2 in a layer thickness range of 2.6 to 3.0 µm and siloxane-based topcoat layer a1 in a layer thickness range of 7.7 to 9.0 µm. This was followed by post-curing using excimer lamps with a wavelength of 172 nm and different radiation doses. ΔHaze was determined after 1000 cycles of the Taber test.

| Radiation dose (mJ/cm²) | ΔHaze (%) | Weathering (score 1-3) |
|---|---|---|
| No irradiation | 2.6 | 1 |
| 700 | 1.4 | 1 |
| 1400 | 1.3 | 1 |
| 2200 | 1.0 | 3 |

Inventive Example 5

Substrate 2 combined with primer layer $a_2$ in a layer thickness range of 2.6 to 3.0 µm and siloxane-based topcoat layer $a_1$ in a layer thickness range of 7.7 to 9.0 µm. This was followed by post-curing using excimer lamps with a wavelength of 172 nm and different radiation doses. ΔHaze was determined after 1000 cycles of the Taber test.

| Radiation dose (mJ/cm²) | ΔGloss | Weathering (score 1-3) |
|---|---|---|
| No irradiation | 4.1 | 1 |
| 700 | 2.0 | 1 |
| 1400 | 1.8 | 1 |
| 2200 | 1.3 | 3 |

Comparative Example 6

Substrate 3 combined with primer layer a2 in a layer thickness range of 2.6 to 3.0 µm and siloxane-based topcoat layer a1 in a layer thickness range of 7.7 to 9.0 µm. This was followed by post-curing using excimer lamps with a wavelength of 172 nm and different radiation doses. ΔGloss was determined after 1000 cycles of the Taber test.

| Radiation dose (mJ/cm²) | ΔGloss | Weathering (score 1-3) |
|---|---|---|
| No irradiation | 6.7 | 1 |
| 700 | 3.8 | 2 |
| 1400 | 2.5 | 3 |
| 2200 | 2.3 | 3 |

It is clearly apparent that irradiation and radiation dose can bring about a reduction in haze value or in gloss after 1000 cycles of Taber irrespective of the substrate. It was further found that as a function of the $T_{DS}$ weathering has a significant influence on the surface quality of the protective layer a in the overall construction. Thus, constructions where $T_{DS}$ is <1% (substrate 3) suffer premature weathering failure (comparative examples 3 and 6). This effect tends to be increasingly severe with increasing radiation dose. It can be concluded from this result that in multi-ply constructions which as a result of the presence of a layer C in the construction have regions having a $T_{DS}$ of <1% and regions having a $T_{DS}$ of >20% a selective surface curing using excimer radiation should only be carried out in the regions having a $T_{DS}$ of >20%. This ensures that the regions having a $T_{DS}$<1% do not suffer premature weathering failure. I.e. in the case of parts having for example a black edge, only the layer construction a) and b) may be irradiated.

The invention claimed is:
1. A multilayer construction, comprising:
a) a siloxane-based protective layer;
b) a transparent layer based on a thermoplastic polymer having a first surface and an opposing second surface, wherein the siloxane-based protective layer is disposed on the first surface; and c) a carrier or frame layer of a nontransparent polymer, disposed on and covering only a portion of the second surface, with a remaining portion not covered forming in plan view a region of the transparent layer having a solar transmittance $T_{DS}$ of greater than 20% (determined according to ISO 13837:2008 at a layer thickness of 4 mm),
wherein the siloxane-based protective layer is post-cured using ultrashortwave UV radiation only in the region where the solar transmittance is greater than 20%, not overlapping with the carrier or frame in plan view.

2. The multilayer construction as claimed in claim 1, wherein the transparent layer is transparent in the visible wavelength range, meaning a light transmission of at least 80% (determined according to ASTM 1003:2011/ISO 13468:2006; reported in % and with illuminant D65/10°).

3. The multilayer construction as claimed in claim 1, wherein the transparent layer is transparent in the IR wavelength range meaning an average transmittance of at least 10% in the range between 750 nm and 2500 nm (determined according to ISO 13468-2:2006) and a light transmission less than 1% in the range between 380 nm and 780 nm (determined according to ISO 13468:2006, with illuminant D65/10°).

4. The multilayer construction as claimed in claim 1, wherein the thermoplastic polymer of the transparent layer is selected from at least one of the group consisting of polycarbonate, copolycarbonate, polyester carbonate, polystyrene, styrene copolymers, aromatic polyesters, polyethylene terephthalate, PET-cyclohexanedimethanol copolymer, polyethylene naphthalate, polybutylene terephthalate, polyamide, cyclic polyolefin, poly- or copolyacrylate, poly- or copolymethacrylate, poly- or copolymethyl methacrylate, polystyrene-acrylonitrile copolymer, and thermoplastic polyurethane.

5. The multilayer construction as claimed in claim 4, wherein the thermoplastic polymer of wherein the thermoplastic polymers of the transparent layer is selected from group consisting of polycarbonate, copolycarbonate, polyester carbonate, aromatic polyesters, and polymethylmethylacrylate.

6. The multilayer construction as claimed in claim 5, wherein the thermoplastic polymer of the transparent layer is polycarbonate.

7. The multilayer construction as claimed in claim 1, wherein the haze value of the transparent layer is less than 3% (measured according to ASTM 1003:2011).

8. The multilayer construction as claimed in claim 1, wherein the carrier or frame is along at least a portion of the peripheral edge of the second surface of the transparent layer.

9. The multilayer construction as claimed in claim 8, wherein the nontransparent polymer is a black polymer blend.

10. The multilayer construction as claimed in claim 9, wherein the black polymer blend is a polycarbonate blend.

11. The multilayer construction as claimed in claim 10, wherein the solar transmittance $T_{DS}$ of carrier or frame is less than 1%.

12. The multilayer construction as claimed in claim 1, wherein the ultrashortwave UV radiation comprises a radiation dose of 200 to 2100 mJ/cm².

13. The multilayer construction as claimed in claim 1, wherein the siloxane-based layer contains organosilicon compounds of formula:

$$R_nSiX_{4-n}, \quad (I)$$

and/or partial condensates thereof,
wherein R is identical or different and represents a linear or branched, saturated or mono- or polyunsaturated or aromatic hydrocarbon X is identical or different and represents hydrolyzable groups or hydroxyl groups, and n is 0, 1, 2, or 3.

14. The multilayer construction as claimed in claim 13, wherein in formula (I) R represents saturated, branched or unbranched alkyl radicals having 1 to 20 carbon atoms and/or represents mono- or polyunsaturated branched or unbranched alkenyl radicals having 2 to 20 carbon atoms or aromatic groups having 6 to 12 carbon atoms,
X represents a C1- to C4-alkoxy group and n is 1 or 2.

15. The multilayer construction as claimed in claim 1, wherein the protective layer comprises a topcoat layer a primer layer, wherein the primer layer is arranged between the topcoat layer and the transparent layer.

16. The multilayer construction as claimed in claim 15, wherein the topcoat layer comprises a polysiloxane-based topcoat comprising:
  i. at least one UV-absorber selected from the group consisting of benzophones, resorcinols, 2-(2-hydroxyphenol)benzotriazoles, hydroxphenyl-s-triazines, cyanoacrylates, and oxalanilides,
and optionally a UV-inhibitor from the group of sterically hindered amines; and
  ii. at least one combination of an organomodified silane with a silica sol.

17. A process for making the multilayer construction as claimed in claim 1, wherein the transparent layer and carrier or frame are formed by a two-component injection molding process.

18. A process for treating the siloxane-based protective layer of the multilayer construction as claimed in claim 1, wherein ultrashortwave UV radiation is generated via excimer lamp or excimer laser.

19. A process for surface treating a multilayer construction, wherein the multilayer construction comprises:
  a) a siloxane-based protective layer;
  b) a transparent layer based on a thermoplastic polymer having a first surface and an opposing second surface, wherein the siloxane-based protective layer is disposed on the first surface; and
  c) a carrier or frame layer of a nontransparent polymer, disposed on and covering only a portion of the second surface, with a remaining portion not covered forming in plan view a region of the transparent layer having a solar transmittance $T_{DS}$ of greater than 20% (determined according to ISO 13837:2008 at a layer thickness of 4 mm),
  wherein the step of surface treating comprises post-curing the siloxane-based protective layer using ultrashortwave UV radiation only in the region where the solar transmittance is greater than 20%, not overlapping with the carrier or frame in plan view.

20. The process for surface treating a multilayer construction as claimed in claim 19, wherein the ultrashortwave UV radiation dose is in the range of 700 to 1400 mJ/cm², generated by an excimer lamp or laser.

* * * * *